Aug. 19, 1941.                M. G. BLANK                2,252,688
                             CAMERA SHUTTER
                          Filed April 25, 1940
FIG. 1.
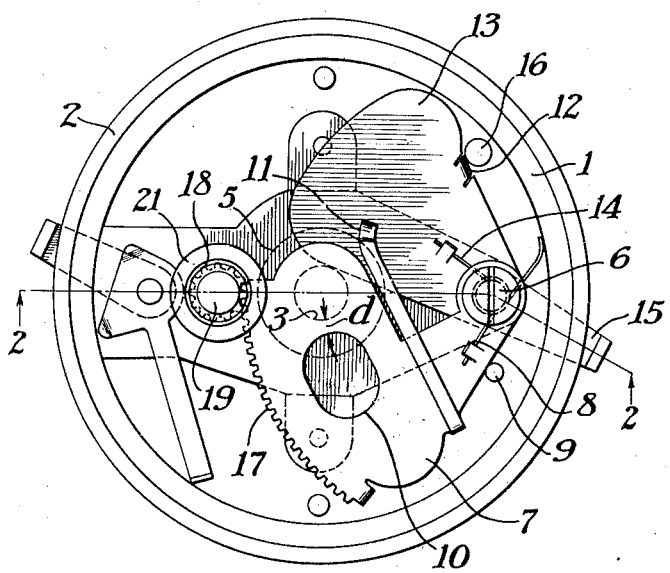
FIG. 2.
FIG. 3.
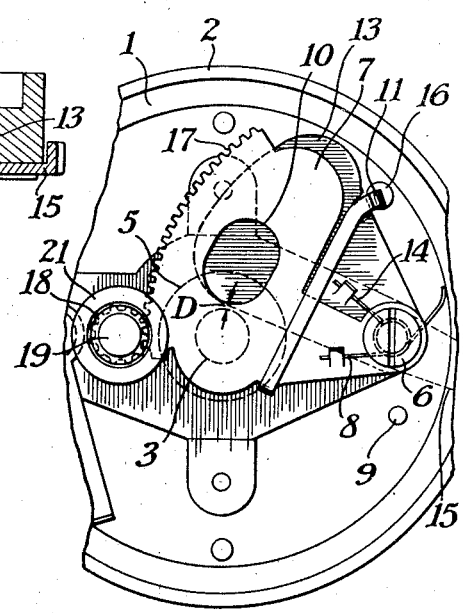
FIG. 4.
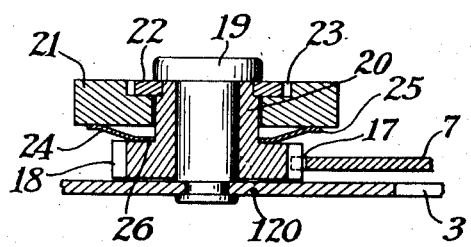
MAURICE G. BLANK
INVENTOR
BY *Newton M. Perrins*
   *Donald H. Stewart*
                    ATTORNEYS Patented Aug. 19, 1941

2,252,688

UNITED STATES PATENT OFFICE 2,252,688

CAMERA SHUTTER

Maurice G. Blank, Rochester, N. Y., assignor to Eastman Kodak Company, Rochester, N. Y., a corporation of New Jersey Application April 25, 1940, Serial No. 331,634

4 Claims. (Cl. 95—60)

This invention relates to photography and more particularly to rebound prevention devices for photographic shutters.

One of the objects of my invention is to provide a shutter in which an exposure may be made by a rapidly operating shutter blade, and to provide means for preventing rebound of the shutter blade as it suddenly comes to rest after making an exposure. Another object of my invention is to utilize a speed controlling device for also controlling the rebound of the shutter blade. Other objects will appear from the following specification, the novel features being particularly pointed out in the claims at the end thereof.

Coming now to the drawing wherein like reference characters denote like parts throughout:

Fig. 1 shows a front plan view of a shutter including my rebound preventing device with the shutter cover removed.

Fig. 2 is a section taken on line 2—2 of Fig. 1.

Fig. 3 is a fragmentary detail view similar to Fig. 1, but with the shutter parts in the position they assume just before an exposure is made.

Fig. 4 is an enlarged fragmentary sectional view through the rebound prevention device.

In most shutters of the between-the-lens type, the space in the shutter case is so restricted that the amount of overlap between one or more shutter blades and an exposure aperture is sometimes extremely small. In most shutters having only a single shutter speed, the exposure is in the neighborhood of 1/25 of a second, so that the shutter blade must move quite rapidly to make such an exposure time and must be suddenly brought to rest after completing the exposure. With more expensive shutters, still higher speeds are often obtained, so that the liability for rebound may be even greater than with the first described type of shutter.

It is obvious that my invention can be applied to numerous different types of shutters, but I have illustrated it as applied to a simple type shown in Patent No. 2,206,811, for "Photographic shutter," Drotning and Martin, granted July 2, 1940 (Serial No. 255,914, filed February 11, 1939).

The shutter may consist of a casing 1, having an upstanding flange 2 around its periphery and having in the center, an exposure aperture 3. As indicated in Fig. 2, the shutter casing may have a rearwardly extending tube 4 which may support an objective or a part of an objective on the flange 5, if desired.

The illustrated embodiment of my invention is a shutter of the so-called blade and cover blind type. On the stud 6 carried by the shutter casing, there is mounted a shutter blade 7, there being a spring 8 for normally thrusting this shutter blade against the stop pin 9. The shutter blade is provided with an exposure opening 10 which is adapted to swing across the exposure opening 3 in making an exposure, and the shutter blade is also equipped with a spring latching arm 11. This latching arm is adapted to engage an upstanding lug 12 on the cover blind 13, also pivoted upon the stud 6 and also moved in a counter-clockwise direction with respect to Fig. 1 by means of a spring 14.

The cover blind 13 is provided with a handle or trigger 15 which extends outside of the shutter casing 1 and into a position for manually operating the shutter. When the shutter is at rest, both the shutter blade and the cover blind lie across the opening 3 with the spring arm 11 in engagement with the latch element 12. Movement of the trigger 15 toward the position shown in Fig. 1 causes the shutter blade and cover blind to move together across the aperture 3, with the cover blind blocking the exposure aperture 10. When the parts reach the position shown in Fig. 3, the latch element 12 rides up on a stud 16, carried by the shutter, releasing the latch from the lug 12 and permitting the spring 8 to swing the shutter blade across the exposure aperture 3 to make an exposure.

The speed of this exposure is controlled, in the present instance, by a rack 17 on the edge of the shutter blade, this rack meshing with a pinion 18, mounted upon a stud 19. As best indicated in Fig. 4, the stud 19 is supported by a shutter plate 120, in which is included the exposure aperture 3, and the pinion 18 is mounted to turn freely upon the stud 19. The pinion 18 is preferably provided with an upwardly extending tubular shaft-like member 20, which in turn revolubly supports a flywheel 21 which may be held in place by a washer 22 engaging the head of the stud 19 on one side and a grooved flange 23 on the flywheel on the other side. The flywheel is not keyed to the sleeve shaft 20, but may turn freely thereon, except for the friction which is created by a light spring washer 24. The outer periphery 25 of the spring washer engages the under side of the flywheel and the inner periphery 26 of the washer presses upon the pinion. Consequently, when the pinion is turned, the flywheel will be turned, although it may not immediately turn as the movement of the pinion 18 is suddenly applied.

With this type of shutter, it is customary to depress the trigger 15 to release the shutter blade 7, and as the spring 8 moves the shutter blade, it rotates the pinion 18 through the gear segment 17. This movement causes the flywheel 21 to turn and to prevent too rapid operation of the shutter blade.

The flywheel, however, does considerably more than this. When the shutter blade 7 suddenly comes to rest by striking the post 9, there is a natural tendency for the shutter blade 7 to rebound, causing a reverse direction of the pinion 18. However, since the flywheel 21 has already received considerably momentum by the time the shutter blade 7 strikes the pin 9, it will continue to rotate after the pinion 18 ceases rotating so that it exerts a force through the spring washer 24 tending to prevent a reversal of movement of the gear 18 and thus effectively preventing rebound of the gear 18 and with it the shutter blade 7.

This is extremely desirable in shutters in which the construction prevents any considerable overlap between the shutter blade 7 and the exposure aperture 3. It will be noted that with the shutter shown in the drawing, which is actually much smaller than the scale on which the drawing is made, there is an extremely short distance D between the exposure aperture 10 and the exposure aperture 3, just before the shutter is released, and there is a comparatively short distance $d$ of overlap between the shutter blade 7, at rest, and the exposure aperture 3. With such construction, the rebound must be either entirely eliminated or must be limited to an extremely small amount to prevent fogging or double images which may occur if there is sufficient rebound for the exposure aperture 10 to cross a material portion of the aperture 3 after an exposure has been completed.

Of course, the amount of retard in shutters of this type is dependent upon a number of factors, such as the weight of the shutter blade, the strength of the operating spring, and the location and nature of the abutment against which the shutter blade suddenly comes to rest. I have found, however, that by providing a light-weight and resilient spring washer 24 between the flywheel 21 and the pinion 18, the continued movement of the flywheel after the shutter comes to rest has reduced rebound to a harmless extent, if it has not entirely eliminated the rebound. With certain shutters equipped with the structure shown in the drawing, the flywheel 21 has rotated from ¼ to ½ a revolution after the pinion 18 has stopped rotating. This has proved entirely satisfactory and is given by way of illustration only, because it might be quite possible to have considerably less movement of the flywheel eliminate rebound, or it might be possible to permit the flywheel to turn one or more revolutions if the pinion 18 is rotated at a comparatively high speed by the gear 17.

What I claim is:

1. A camera shutter of the type including a casing, movable mechanism inside of the casing for making an exposure, and means for controlling the speed of an exposure including a pinion and flywheel, having in combination, a spring frictional connection between the said flywheel and pinion, whereby said flywheel, by continuing to rotate after an exposure is completed, may eliminate rebound of the exposure mechanism suddenly coming to rest.

2. In a camera shutter, the combination with a shutter casing having an exposure aperture therein, of a pivoted shutter blade for covering and uncovering the opening, mechanism for moving the shutter blade, a trigger cooperating with the mechanism for actuating said mechanism, means for controlling the speed of the shutter blade comprising a pinion geared thereto, and a flywheel, a frictional connection between the pinion and the flywheel, said flywheel preventing rebound of the shutter blade by continuing to rotate after the blade comes to rest and after an actuation of the shutter mechanism through an operation of the trigger.

3. In a camera shutter, the combination with a shutter casing having an exposure aperture therein, of a pivoted shutter blade for covering and uncovering the opening, mechanism for moving the shutter blade, a trigger cooperating with the mechanism for actuating said mechanism, means for controlling the speed of the shutter blade comprising a pinion geared thereto, a stud carried by the shutter, said pinion being mounted to turn about the stud, a flywheel mounted on the stud and means for frictionally turning the flywheel from the pinion as an exposure is made, said flywheel continuing to turn after the pinion comes to rest preventing rebound thereof.

4. In a camera shutter, the combination with a shutter casing having an exposure aperture therein, of a pivoted shutter blade for covering and uncovering the opening, mechanism for moving the shutter blade, a trigger cooperating with the mechanism for actuating said mechanism, means for controlling the speed of the shutter blade comprising a pinion geared thereto, a stud carried by the shutter, a pinion and a flywheel coaxially mounted on the stud, a spring washer carried between the pinion and flywheel, whereby the latter may be turned by the former, said flywheel also preventing rebound of the pinion by continuing to turn after said pinion comes to rest.

MAURICE G. BLANK.